(12) United States Patent
Yuen et al.

(10) Patent No.: US 11,043,674 B2
(45) Date of Patent: Jun. 22, 2021

(54) BATTERY ELECTRODE WITH CARBON ADDITIVES IN META-SOLID-STATE BATTERY

(71) Applicant: The Hong Kong University of Science and Technology, Hong Kong (CN)

(72) Inventors: Matthew Ming-Fai Yuen, Hong Kong (CN); Francesco Ciucci, Hong Kong (CN); Stephen Chin-To Kwok, Hong Kong (CN); Kan Kan Yeung, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 170 days.

(21) Appl. No.: 16/098,353

(22) PCT Filed: May 3, 2016

(86) PCT No.: PCT/CN2016/080879
§ 371 (c)(1),
(2) Date: Nov. 1, 2018

(87) PCT Pub. No.: WO2017/190270
PCT Pub. Date: Nov. 9, 2017

(65) Prior Publication Data
US 2019/0165376 A1    May 30, 2019
US 2020/0212445 A9    Jul. 2, 2020

(51) Int. Cl.
*H01M 4/62* (2006.01)
*H01M 4/04* (2006.01)
(Continued)

(52) U.S. Cl.
CPC ......... *H01M 4/625* (2013.01); *H01M 4/0404* (2013.01); *H01M 4/0471* (2013.01);
(Continued)

(58) Field of Classification Search
CPC .. H01M 4/625; H01M 4/0404; H01M 4/0471; H01M 4/139; H01M 4/38;
(Continued)

(56) References Cited

U.S. PATENT DOCUMENTS

| 2005/0266150 A1* | 12/2005 | Yong | H01M 4/0416 |
| | | | 427/58 |
| 2009/0117461 A1* | 5/2009 | Shembel | H01M 4/0404 |
| | | | 429/217 |
| 2013/0017432 A1* | 1/2013 | Roumi | H01M 2/18 |
| | | | 429/145 |

FOREIGN PATENT DOCUMENTS

| CN | 1319904 A | 10/2001 |
| CN | 1555591 A | 12/2004 |

(Continued)

OTHER PUBLICATIONS

International Search Report issued in PCT/CN2016/080879 dated Jan. 17, 2017 (2 pages).
(Continued)

*Primary Examiner* — Helen Oi K Conley
(74) *Attorney, Agent, or Firm* — Osha Bergman Watanabe & Burton LLP

(57) ABSTRACT

A meta-solid-state battery includes a first layer disposed on a first current collector, a second layer disposed on a second current collector, and third layer disposed between the first layer and the second layer. The first layer and the second layer are the cathode and anode electrodes. The third layer includes a first meta-solid-state electrolyte material. Each of the cathode and anode electrodes contain: an active material in an amount ranging from approximately 70% to 99.98% by weight, a carbon additive in an amount ranging from approximately 0.010% to 20% by weight, and a second meta-solid-state electrolyte material in an amount ranging from approximately 0.010% to 10% by weight. The first and
(Continued)

second meta-solid-state electrolyte material include a gel polymer.

13 Claims, 9 Drawing Sheets

(51) Int. Cl.
  *H01M 4/485* (2010.01)
  *H01M 4/505* (2010.01)
  *H01M 4/525* (2010.01)
  *H01M 4/56* (2006.01)
  *H01M 4/48* (2010.01)
  *H01M 4/58* (2010.01)
  *H01M 4/139* (2010.01)
  *H01M 4/38* (2006.01)
  *H01M 10/0525* (2010.01)
  *H01M 10/0565* (2010.01)
  *H01M 10/0585* (2010.01)

(52) U.S. Cl.
  CPC ............ *H01M 4/139* (2013.01); *H01M 4/38* (2013.01); *H01M 4/48* (2013.01); *H01M 4/485* (2013.01); *H01M 4/505* (2013.01); *H01M 4/525* (2013.01); *H01M 4/56* (2013.01); *H01M 4/5825* (2013.01); *H01M 10/0525* (2013.01); *H01M 10/0565* (2013.01); *H01M 10/0585* (2013.01); *H01M 2300/0011* (2013.01); *H01M 2300/0068* (2013.01); *H01M 2300/0085* (2013.01); *H01M 2300/0091* (2013.01)

(58) Field of Classification Search
  CPC ........ H01M 4/48; H01M 4/485; H01M 4/505; H01M 4/525; H01M 4/56; H01M 4/5825; H01M 10/0525; H01M 10/0565; H01M 10/0585
  See application file for complete search history.

(56) References Cited

FOREIGN PATENT DOCUMENTS

| | | | |
|---|---|---|---|
| CN | 101152670 A | 4/2008 | |
| CN | 101997140 A | 3/2011 | |
| CN | 103367798 A | 10/2013 | |
| CN | 103748710 A | 4/2014 | |
| JP | 2000-067866 | * 3/2000 | .............. H01M 4/62 |

OTHER PUBLICATIONS

Written Opinion of the International Searching Authority issued in PCT/CN2016/080879 dated Jan. 16, 2017 (4 pages).

Office Action issued in corresponding Chinese Application No. 201680084854.X, dated Dec. 3, 2020 (9 pages).

* cited by examiner

BATTERY ELECTRODE WITH CARBON ADDITIVES IN META-SOLID-STATE BATTERY

FIELD OF INVENTION

Embodiments of the invention generally relate to a meta-solid-state battery, and a method for producing an electrode for a meta-solid-state battery.

BACKGROUND

A growing need has been determined for energy storage systems for future unmanned vehicles as well as for portable electronic devices. Presently, the majority of energy storage systems used in transportation systems still rely on conventional batteries that contain liquid electrolytes. However, liquid electrolytes are highly flammable, corrosive, and decompose easily under high temperature. As a result, safer alternatives are constantly being sought after.

Solid-state batteries contain many advantages over conventional batteries that contain liquid electrolytes. In fact, solid-state batteries are non-flammable, non-volatile, and inert. In addition, solid-state batteries can be fabricated into thin film structures, which can significantly reduce the battery weight and size. However, a major hurdle for developing a successful solid-state battery is the minimization of the resistance between the electrodes and the solid-state electrolyte. A high interfacial resistance hinders the ionic transport across interfaces, which leads to a major challenge in the development of solid-state batteries.

SUMMARY

A meta-solid-state battery includes a first layer disposed on a first current collector, a second layer disposed on a second current collector, and third layer disposed between the first layer and the second layer. The first layer and the second layer are the cathode and anode electrodes. The third layer includes a first meta-solid-state electrolyte material. Each of the cathode and anode electrodes contain: an active material in an amount ranging from approximately 70% to 99.98% by weight, a carbon additive in an amount ranging from approximately 0.01% to 20% by weight, and a second meta-solid-state electrolyte material in an amount ranging from approximately 0.01% to 10% by weight. The first and second meta-solid-state electrolyte materials include a gel polymer.

A method for producing an electrode for a meta-solid-state battery includes steps for obtaining a plurality of materials for the electrode, mixing the plurality of materials to form a mixture, disposing the mixture on a current collector, and curing the mixture disposed on the current collector. The plurality of materials for the electrode includes an active material in an amount ranging from approximately 70% to 99.98% by weight, a carbon additive in an amount ranging from approximately 0.01% to 20% by weight, and a meta-solid-state electrolyte material in an amount ranging from approximately 0.01% to 10% by weight. The meta-solid-state electrolyte material is composed of a gel polymer.

Other aspects and advantages of one or more embodiments will be apparent from the following description and the appended claims.

DETAILED DESCRIPTION

Figure 1A:
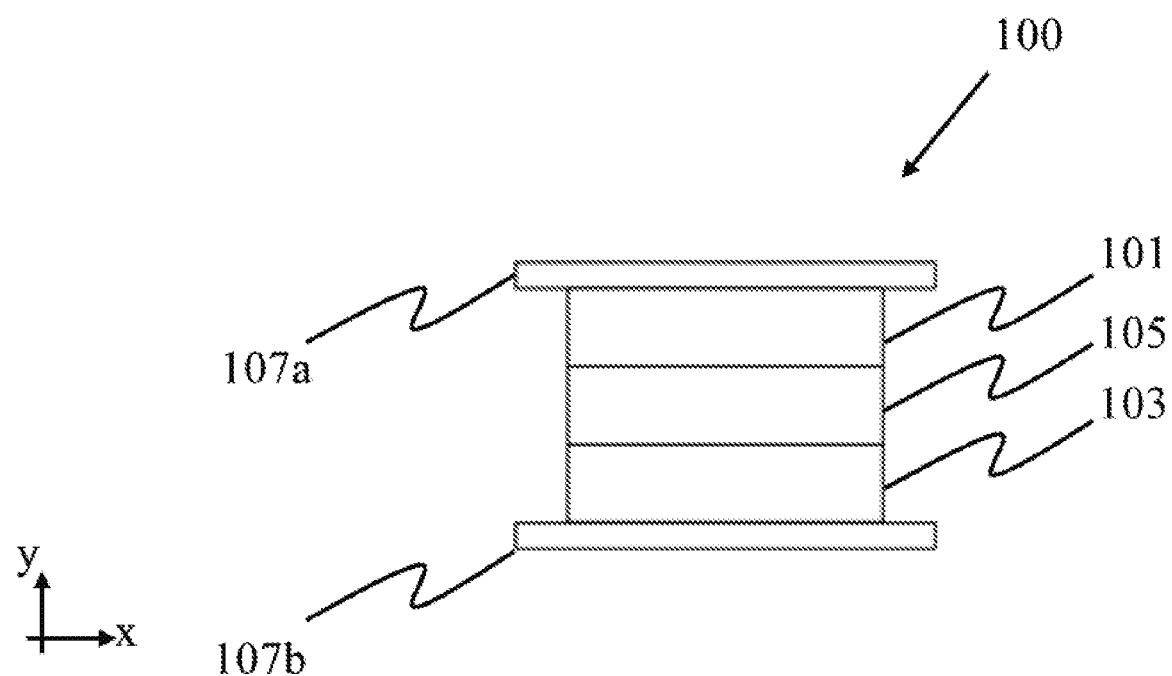
FIGS. 1A-D shows a meta-solid-state battery in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding by one of ordinary skill in the art. However, it will be apparent to one of ordinary skill in the art that the embodiments described herein may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms like "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In general, embodiments described herein relate to the development of a meta-solid-state battery with low charge transfer resistance, effective ionic transport, and high electric conductivity. Specifically, embodiments discussed herein provide a meta-solid-state battery with a first meta-solid-state electrolyte material disposed in electrical contact between a cathode and an anode electrode that each contain an active material, a carbon additive, and a second meta-solid-state electrolyte material. Furthermore, in one or more embodiments described herein, the meta-solid-state battery may be, but is not limited to, a rechargeable battery.

In the research area of solid-state electrolytes, the term "meta" usually refers to a solid-state electrolyte with two or more ionic conducting phases that coexist together where ions can be transferred from one phase to the other with high ionic conductivity. In one or more embodiments, the meta-solid-state electrolyte includes inorganic ceramic-based particles that are uniformly dispersed in an organic polymericbased gel matrix where ions can be transferred from the organic polymer matrix to the inorganic ceramic-based particles. For example, to form a more effective electrode and solid-state electrolyte interface, in one or more embodiments, a gel polymer is mixed with ionic conducting ceramic particles to form a meta-solid-state electrolyte. Alternatively, in one or more embodiments, the gel polymer is mixed with sulfuric acid ($H_2SO_4$) to form a meta-solid-state electrolyte.

Furthermore, in one or more embodiments, to provide better contact and ionic transport, the meta-solid-state electrolyte is mixed with an active material to fill into the gaps between irregular-shaped particles within the electrode. However, due to the poor electronic conductivity of the meta-solid-state electrolyte, the electronic conductivity of the electrode is sacrificed. In order to improve the electrode's electronic conductivity carbon additives such as graphene and other carbon allotropes that have high electronic conductivity may be added into the electrode.

In reference to the active material discussed above, the active material may be any material that is essential for normal functioning of a device. In one or more embodiments described herein, the active material may be, but is not limited to, constituents of a cell that participate in the electrochemical charge/discharge reaction. Examples of the active material may include, but are not limited to, lead (Pb), lead oxide ($PbO_2$), lithium titanate oxide (LTO), lithium iron phosphate (LFP), lithium ruthenium tin oxide (LRS), lithium nickel cobalt manganese oxide (NMC), and lithium nickel manganese oxide (LNM).

In reference to the electrode discussed above, the electrode is not limited only to battery applications. In one or more embodiments described herein, the electrode may be either an anode electrode carrying a positive charge or a cathode electrode carrying a negative charge. The electrode can be any type of an electrical conductor through which electricity enters or leaves an object, substance, or region. In one or more embodiments described herein, the electrode may or may not be in contact with either a metallic or nonmetallic part of a circuit.

The electrodes manufactured using the methods of one or more embodiments described herein can be either an anode or a cathode, depending on the preparation process of the electrode. Opposite polarities of the electrodes manufactured using the methods of one or more embodiments can be paired with each other to form a complete set. A set of a completed meta-solid-state battery cell consists of electrodes with electrolyte separators sandwiched in between. Furthermore, the electrodes manufactured using the methods of one or more embodiments can be paired with readily available electrodes that can be purchased or obtained by one of ordinary skill in the art. For example, an electrode manufactured using the methods of one or more embodiments is able to be paired with an existing electrode of the opposite polarity that is made of similar active material.

The assembled electrodes of one or more embodiments were subjected to electrochemical impedance spectroscopy (EIS) testing with a frequency range of 1 Hz to 10 kHz and an amplitude of 0.1V. The EIS testing was conducted with a electrochemical workstation that is equipped with AC impedance technique on a lead or lead-graphene working electrode and an lead oxide counter electrode. The impedance data obtained were fitted with an equivalent circuit model to extract the values for charge transfer resistance ($R_{CT}$). The results demonstrated that, in an example with an electrode modified with graphene, the $R_{CT}$ of the electrode is reduced by approximately 21% when compared to a battery of one or more embodiments without electrodes modified with a carbon additive.

The assembled electrodes of one or more embodiments were also subjected to deep cycle tests at 20 mA charge and discharge. The discharge curve results show that the discharge time of a graphene modified electrode of one or more embodiments is longer than that of an electrode of one or more embodiments without carbon additives by approximately 6% under the same testing conditions. Although not confined to a particularly theory as to why the embodiments described herein has increase in discharge time, it is possible that the increase in discharge time may be a result of a reduction in the $R_{CT}$, which leads to higher reversibility of active particles.

In addition, an addition of graphene and graphene oxide to the electrodes of a conventional battery containing liquid electrolytes shows an enhancement in the partial-state-of-charge (PSoC) cycle life of the electrode. The cycle life of the electrode of the conventional battery containing liquid electrolytes is enhanced by more than approximately 200% with the addition of graphene and graphene oxide.

FIGS. 1A-D show a meta-solid-state battery (100) in accordance with one or more embodiments. The meta-solid-state battery (100), as shown in FIGS. 1A-D, has multiple components including a first layer (101), a second layer (103), a third layer (105), a first meta-solid-state electrolyte material (106), a first current collector (107a), a second current collector (107b), an external device (108), an active material (109), a carbon additive (111), a second meta-solid-state electrolyte material (113), a first meta-solid-state electrolyte interface, a second meta-solid-state electrolyte interface, lithium salt (115), and ionic conducting ceramic particles (117). The various components and structures of the meta-solid-state battery (100) listed above may interact directly or indirectly with one another. Each of these components will be described below in more detail.

FIG. 1A shows a structural illustration of the meta-solid-state battery (100) according to one or more embodiments, including all of the components that make up the complete meta-solid-state battery (100). The meta-solid-state battery (100) of FIG. 1A incldes the first layer (101), the second layer (103), the third layer (105), the first current collector (107a), and the second current collector (107b). In one or more embodiments, the meta-solid-state battery (100) may be, but is not required to be, a rechargeable battery.

In one or more embodiments, the first layer (101) is a cathode electrode of the meta-solid-state battery (100) and the second layer (103) is an anode electrode of the meta-solid-state battery (100). In one or more embodiments, the first layer (101) may be the anode electrode and the second layer (103) may be the cathode electrode. In one or more embodiments, the first layer (101) and the second layer (103) have, but are not limited to, the same shape.

In one or more embodiments, the shape of the first layer (101) and the second layer (103) may be, but is not limited to, a circle, a square, a rectangle, or a polygon. The thickness, from a measurement taken in the y-axis of the two-dimensional view as shown in FIG. 1A, of the first layer (101) and the second layer (103), may be within a range of approximately 1 µm to 1 cm.

Although certain shapes and thicknesses have been described above, it will now be apparent to one of ordinary skill in that the shape and thickness of the first layer (101) and the second layer (103) may vary depending on the specific battery model.

In one or more embodiments, the third layer (105) is an electrolyte layer of a first meta-solid-state electrolyte material. In one or more embodiments, the thickness, from a measurement taken in the y-axis of the two-dimensional view as shown in FIG. 1A, of the third layer (105) may be within a range of approximately 1 μm to 1 cm. In one or more embodiments, the third layer (105) is the same shape as the first layer (101) and the second layer (103).

In one or more embodiments, the first current collector (107a) and the second current collector (107b) may have, but is not limited to, the same shape as the first layer (101), the second layer (103), and the third layer (105). The thickness, from a measurement taken in the y-axis of the two-dimensional view as shown in FIG. 1A, of the first current collector (107a) and the second current collector (107b) may be within a range of approximately 10 μm to 1 cm.

In one or more embodiments, the combined thickness, from a measurement taken in the y-axis of the two-dimensional view as shown in FIG. 1A, of a current collector and an electrode is approximately 2 mm. Alternatively, in one or more embodiments, the combined thickness, from a measurement taken in the y-axis of the two-dimensional view as shown in FIG. 1A, of a current collector and an electrode is approximately 80 μm.

In one or more embodiments, the material of the first current collector (107a) and the second current collector (107b) may be, but is not limited to, lead (Pb) alloy, aluminum (Al), copper (Cu), nickel (Ni), iron-nickel (Fe—Ni), stainless steel, or carbon (C). In one or more embodiments, the material of the first current collector (107a) or second current collector (107b), whichever is used for the anode electrode, is carbon (C).

As seen in FIG. 1A, one or more embodiments, the first layer (101) is disposed on either the first current collector (107a) or the second current collector (107b) and the second layer (103) is disposed on the alternative current collector. Alternatively, the first layer (101) and the second layer (103) can be disposed on the alternative current collector. In one or more embodiments, the electrons from the external electrical circuit can be transferred through the current collectors into the respective first and second layers. In one or more embodiments, the third layer (105) is disposed between the first layer (101) and the second layer (103).

In one or more embodiments, the term "disposed" is defined as a surface of a first component is "in physical contact with" a surface of a second component. For example, in terms of the first layer (101) and the third layer (105), a surface of the first layer (101) is in physical contact with a surface of the third layer (105). In a further example, in terms of all three layers, one surface of the third layer (105) is in physical contact with a surface of the first layer (101) while an opposite surface of the third layer (105) is in contact with a surface of the second layer (103). In one or more embodiments, the term "disposed" is alternatively or further defined as "in electrical contact with". For example, it is possible to transport ions and electrical charges between the surfaces of the two components that are disposed on each other.

Figure 1B:
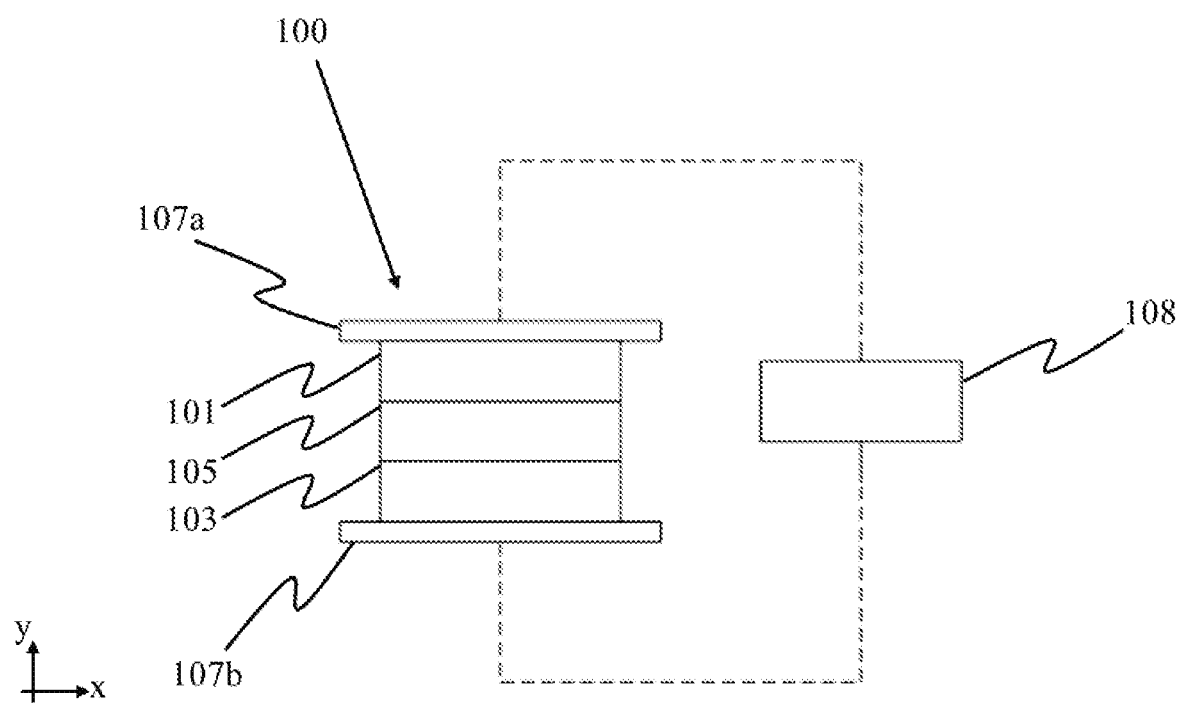

As seen in FIG. 1B, in one or more embodiments, the meta-solid-state battery (100) of FIG. 1A may further be connected to the external device (108). In one or more embodiments, the meta-solid-state battery (100) may be connected, either directly or indirectly, to the external device (108). Alternatively, in one or more embodiments, the meta-solid-state battery (100) may also be directly inserted into the external device (108).

The external device (108) as shown in FIG. 1B may be any electrical device that is able to provide or receive an electrical charge from the meta-solid-state battery (100). For example, the external device may be one of, but is not limited to, a battery charger, an electrical circuit, an electrical device or appliance, and a mechanical motor.

In one or more embodiments, the first current collector (107a) and the second current collector (107b) are configured to receive electrons from or to provide electrons to the external device (108). It would be apparent to one of ordinary skill in the art that the external device (108) may comprise a positive and a negative terminal. Accordingly, the anode electrode and the cathode electrode of the meta-solid-state battery (100) must be properly connected to the respective terminals of the external device (108) in order for electrical charges to flow between the two components.

It would further be apparent to one of ordinary skill in the art that direct contact between the surface of the meta-solid-state battery (100) and the surface of the external device (108) is not required. For example, an indirect connection between the meta-solid-state battery (100) and the external device (108) may be achievable through electrical conducting leads or wires.

Figure 1C:
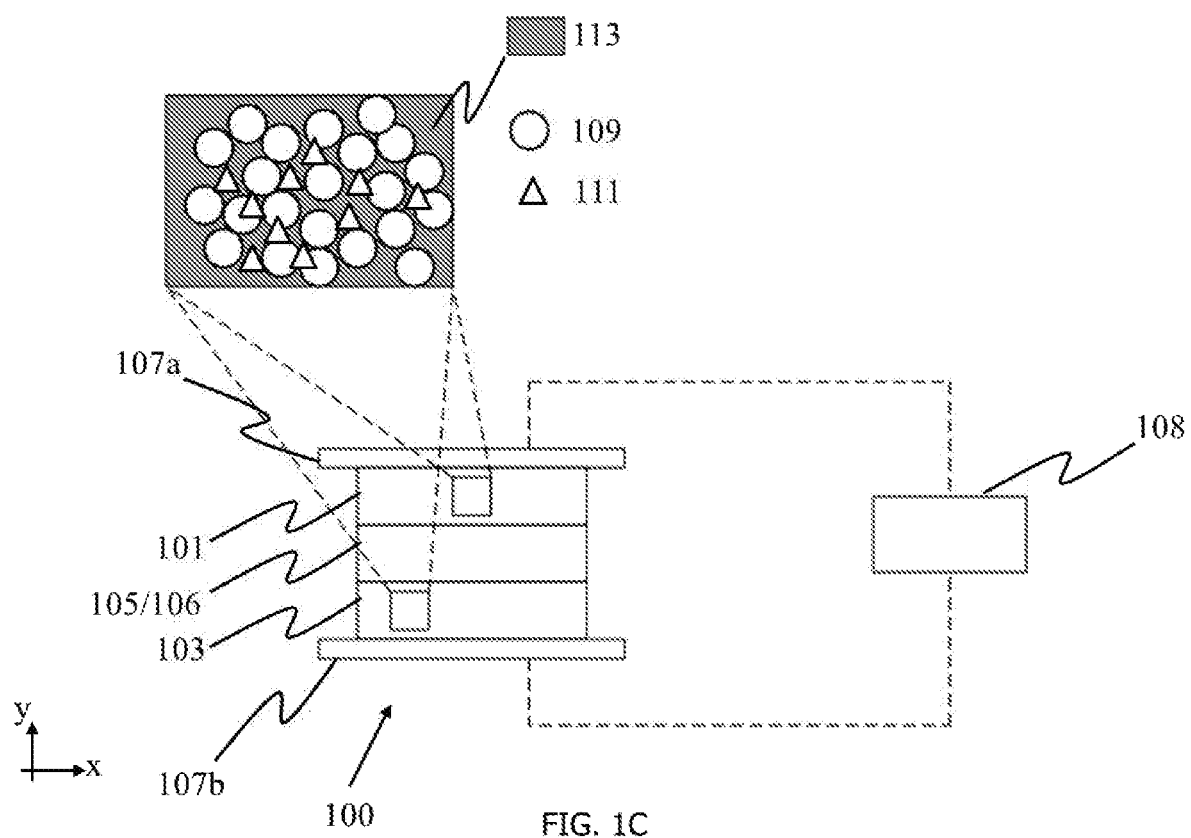

FIG. 1C shows the composition of each layer of the meta-solid-state battery (100) according to one or more embodiments. As seen in FIG. 1C, in one or more embodiments, the first layer (101) and the second layer (103) of the meta-solid-state battery (100) both have a composition that includes the active material (109), the carbon additive (111), and the second meta-solid-state electrolyte material (113). Furthermore, the third layer (105) contains a composition of the first meta-solid-state electrolyte material (106). In one or more embodiments, the first meta-solid-state electrolyte material (106) and the second meta-solid-state electrolyte material (113) may be composed of, but is not limited to, the same material composition. Each of the components that make up the composition of the first layer (101), the second layer (103), and the third layer (105) are described below in more detail.

In one or more embodiments, the active material (109) may be, but is not limited to lead (Pb), lead oxide ($PbO_2$), lithium titanate oxide (LTO), lithium iron phosphate (LFP), lithium ruthenium tin oxide (LRS), lithium nickel cobalt manganese oxide (NMC), or lithium nickel manganese oxide (LNM). The type of active material determines whether the meta-solid-state battery (100) is a lead-acid battery or a lithium-ion battery. In one or more embodiments, the active material (109) is lead (Pb) or lead oxide ($PbO_2$). In such cases, the meta-solid-state battery (100) of FIG. 1 is a lead-acid battery. Alternatively, in the case that the active material is one of lithium titanate oxide (LTO), lithium iron phosphate (LFP), lithium ruthenium tin oxide (LRS), lithium nickel cobalt manganese oxide (NMC), or lithium nickel manganese oxide (LNM), the meta-solid-state battery (100) of FIG. 1 is a lithium-ion battery.

In one or more embodiments, the carbon additive (111) may be any carbon allotropes, such as, but is not limited to, carbon black, carbon fiber, carbon nanotubes, graphite, graphite oxide, graphene or graphene oxide. In one or more embodiments, the size of the carbon additive may be, but is not limited to, a size within the range of approximately 0.1 nm to 500 μm.

In one or more embodiments, the first meta-solid-state electrolyte material (106) and the second meta-solid-state electrolyte material (113) may have, but is not limited to, the same material composition. In one or more embodiments, the first meta-solid-state electrolyte material (106) and the second meta-solid-state electrolyte material (113), may be, but is not limited to, a gel polymer. In one or more embodiments, the gel polymer may be, but is not limited to, polyaniline (PANI), polyvinyl alcohol (PVA), silica gel or polydimethylsiloxane (PDMS), polyacrylonitrile (PAN) or polyacrylicacid (PAA). The type of gel polymer determines whether the meta-solid-state battery (100) is a lead-acid battery or a lithium-ion battery. In one or more embodiments, in the example of the lead-acid battery, the gel polymer is polyaniline (PANI), polyvinyl alcohol (PVA), or silica gel or polydimethylsiloxane (PDMS). In one or more embodiments, the first meta-solid-state electrolyte material (106) is only ionically conductive and cannot be electrically conductive. In one or more embodiments, the first meta-solid-state electrolyte material (106) is not polyaniline (PANI).

In one or more embodiments, in the example of the lead-acid battery, the gel polymer of the first and second meta-solid-state electrolyte is further mixed with sulfuric acid ($H_2SO_4$) in an amount of approximately 20% to 95% by weight of the first and second meta-solid-state electrolyte material.

In one or more embodiments, the phrase of "by weight of the first and second meta-solid state electrolyte material", as used above, is defined as the total weight percentage of one of the first or second meta-solid-state electrolyte material. For example, in one or more embodiments, the first meta-solid-state electrolyte material (106) has a weight percentage of approximately 100%. The total weight of the gel polymer and the sulfuric acid ($H_2SO_4$) would add up to a total weight percentage of approximately 100%. Similarly, in one or more embodiments, the second meta-solid-state electrolyte material (113) also has a weight percentage of approximately 100%. The total weight of the gel polymer and the sulfuric acid ($H_2SO_4$) would add up to a total weight percentage of approximately 100%. In one or more embodiments, the first meta-solid-state electrolyte material (106) contains 80% gel polymer by weight and 20% sulfuric acid ($H_2SO_4$) by weight and the second meta-solid-state electrolyte material (113) contains 5% gel polymer by weight and 95% sulfuric acid ($H_2SO_4$) by weight.

Alternatively, in one or more embodiments, in the example of the lithium-ion battery, the gel polymer is polyacrylonitrile (PAN) or polyacrylicacid (PAA).

In one or more embodiments, the first meta-solid-state electrolyte interface and the second meta-solid-state electrolyte interface are areas on the surface of either the first or second meta-solid-state electrolyte material that come into direct contact with the active material (109). For example, the first meta-solid-state interface is considered any area of the first meta-solid-state electrolyte material (106) at the surface of the third layer (105) that is in contact with the active material (109) at the surface of the first layer (101) and the second layer (103). The second meta-solid-state electrolyte interface is considered any area of the second meta-solid-state electrolyte material (113) within the first layer (101) and the second layer (103) that is in contact with the active material (109) within the first layer (101) and the second layer (103). Although the first and second meta-solid-state electrolyte interfaces are not shown in the FIGS. 1A-D, it will now be apparent to one of ordinary skill in the art that the first and second meta-solid-state electrolyte interfaces exist throughout the meta-solid-battery (100) in areas where the first and second meta-solid-state electrolyte materials are in direct contact with the active material (109).

In one or more embodiments, the first layer (101) is composed of a material composition that includes the active material (109) in an amount of approximately 70% to 99.98% by weight of the first layer (101), the carbon additive (111) in an amount of approximately 0.01% to 20% by weight of the first layer (101), and the second meta-solid-state electrolyte material (113) in an amount of approximately 0.01% to 10% by weight of the first layer (101). Similarly, in one or more embodiments, the second layer (103) has, but is not limited to, the same material composition as the first layer (101). In one or more embodiments, the material composition of the second layer (103) may be, but is not limited to, the same amount by weight as described above for the first layer (101).

It would be apparent to one of ordinary skill in the art that the amount of each material by weight may vary depending on the specific battery model. It would also be apparent to one of ordinary skill in the art that the amount by weight of each material described above may vary depending on the type of electrode being manufactured (cathode or anode).

In one or more embodiments, the phrase of "by weight of the first layer (101)", as used above, is defined as the total weight percentage of the first layer (101). For example, in one or more embodiments, the first layer (101) has a weight percentage of approximately 100%. The total amount of the active material (109), the carbon additive (111), and the second meta-solid-state material (113) within the first layer (101) would add up to a total weight percentage of approximately 100%. Similarly, in one or more embodiments, the second layer (103) also has a weight percentage of approximately 100%. The total weight of the active material (109), the carbon additive (111), and the second meta-solid-state material (113) within the second layer would add up to a total weight percentage of approximately 100%. Depending on the specific battery model, the actual weight of the first layer (101) and the second layer (103) may vary.

In one or more embodiments, the first meta-solid-state electrolyte material of the third layer (105) acts as a separator between the first layer (101) and the second layer (103). In one or more embodiments, the second meta-solid-state electrolyte material (113) acts as a filling that fills the gaps between the particles of the active material (109) within each of the first layer (101) and the second layer (103).

The configuration of the first and second meta-solid-state electrolytes as described above provides better contact and ionic transport between the active material (109) and the first and second meta-solid-state electrolyte materials. In addition, the carbon additives in the first layer (101) and the second layer (103) can act as the electronic conductive network for electron transport. In one or more embodiments, the carbon additives in the first layer (101) and the second layer (103) enhances the electronic conductivity of the first and second layers.

Figure 1D:
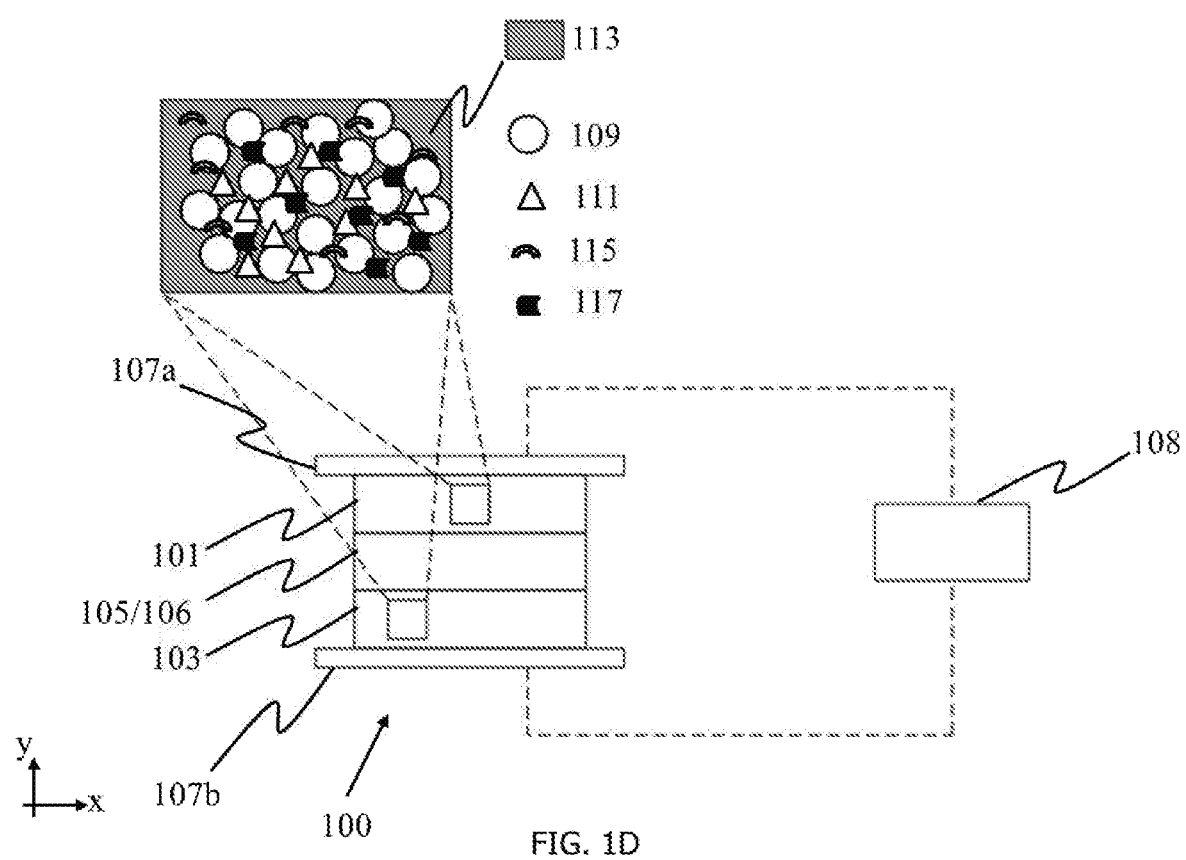

FIG. 1D, shows the composition of each layer of the meta-solid-state battery (100) according to one or more embodiments. As seen in FIG. 1D, in one or more embodiments, the first layer (101) and the second layer (103) of the meta-solid-state battery (100) are both composed of a combination of the active material (109), the carbon additive (111), and the second meta-solid-state electrolyte material (113). Furthermore, the third layer (105) contains a composition of the first meta-solid-state electrolyte material (106). The active material (109), the carbon additive (111), the first meta-solid-state electrolyte material (106), and the second meta-solid-state electrolyte material (113) have been described above in one or more embodiments of FIG. 1C. As described in FIG. 1C, in one or more embodiments, the first meta-solid-state electrolyte material (106) and the second meta-solid-state electrolyte layer (113) may have, but is not limited to, the same material composition.

In one or more embodiments, the meta-solid-state battery (100) of FIG. 1D is a lithium-ion battery. As seen in FIG. 1D, the composition of the first layer (101) and the second layer (103) further comprises the lithium salt (115), and the ionic conducting ceramic particles (117). The lithium salt (115) and the ionic conducting ceramic particles (117) are described below in more detail.

It would be apparent to one of ordinary skill in the art that, in one or more embodiments, the active material (109) of the meta-solid-state battery (100) of FIG. 1D is one of lithium titanate oxide (LTO), lithium iron phosphate (LFP), lithium ruthenium tin oxide (LRS), lithium nickel cobalt manganese oxide (NMC), or lithium nickel manganese oxide (LNM). In one or more embodiments, the gel polymer of the first and second meta-solid-state electrolyte material of the meta-solid-state battery (100) of FIG. 1D is polyacrylonitrile (PAN) or polyacrylicacid (PAA).

In one or more embodiments, the lithium salt (115) may be any type of salt that contains lithium ions such as, but is not limited to, $LiPF_6$, $Li[N(SO_2F)_2]$ and $LiN(SO_2CF_3)_2$.

In one or more embodiments, the ionic ceramic particles (117) may be, a type of lithium garnet such as, but is not limited to, $Li_7La_3Zr_2O_{12}$, $Li_3OCl$ anti-perovskite, NASICON, LiAlTiSiPO (LATP), and $Li_{7-x}La_3Zr_{2-x}Ta_xO_{12}$. Depending on the type of lithium garnet selected, the shape and size of the lithium garnet may vary.

In one or more embodiments, the first meta-solid-state electrolyte material (106) containing only gel polymer may further contain lithium salt (115) in an amount of approximately 95% to 98% by weight of the first meta-solid-state electrolyte material (106). In one or more embodiments, the first meta-solid-state electrolyte material (106) containing only the combination of the mixture of the gel polymer and the lithium salt (115) may further contain ionic ceramic particles (117) in an amount of approximately 90% to 94% by weight of the first meta-solid-state electrolyte material (106) containing the combination of the mixture of the gel polymer and the lithium salt (115).

In one or more embodiments, the phrase "by weight of the first meta-solid-state electrolyte material (106)," as used above, is defined as the total weight percentage of the first meta-solid-state electrolyte material (106) containing only the gel polymer and the lithium salt (115). For example, in one or more embodiments, the total weight of the first meta-solid-state electrolyte material (106) may contain approximately 95% to 98% of the lithium salt (115) and approximately 2% to 5% of the gel polymer, respectively. Depending on the specific battery model, the actual weight of the first meta-solid-state electrolyte material (106) may vary.

Similarly, in one or more embodiments, the phrase "by weight of the first meta-solid-state electrolyte material (106) containing the combination of the mixture of the gel polymer and the lithium salt (115)," as used above, is defined as the total weight percentage of the first meta-solid-state electrolyte material (106) containing the combination of the gel polymer, the lithium salt (115), and the ionic ceramic particles (117). For example, in one or more embodiments, the total weight of the first meta-solid-state electrolyte (106) material may contain approximately 90% to 94% of the ionic ceramic particles (117) and approximately 6% to 10% of the gel polymer and lithium salt (115) mixture, respectively. Depending on the specific battery model, the actual weight of the first meta-solid-state electrolyte material (106) may vary.

In one or more embodiments, the second meta-solid-state electrolyte material (113) containing only gel polymer may further contain lithium salt (115) in an amount of approximately 95% to 98% by weight of the second meta-solid-state electrolyte material. (113) In one or more embodiments, the second meta-solid-state electrolyte material containing the combination of the mixture of the gel polymer and the lithium salt (115) may further contain ionic ceramic particles (117) in an amount of approximately 90% to 94% by weight of the second meta-solid-state electrolyte material (113) containing the combination of the mixture of the gel polymer and the lithium salt (115).

In one or more embodiments, the phrase "by weight of the second meta-solid-state electrolyte material (113)," as used above, is defined as the total weight percentage of the second meta-solid-state electrolyte material (113) containing only the gel polymer and the lithium salt (115). For example, in one or more embodiments, the total weight of the second meta-solid-state electrolyte material (113) may contain approximately 95% to 98% of the lithium salt (115) and approximately 5% to 10% of the gel polymer, respectively. Depending on the specific battery model, the actual weight of the second meta-solid-state electrolyte material (113) may vary.

Similarly, in one or more embodiments, the phrase "by weight of the second meta-solid-state electrolyte material (113) containing the combination of the mixture of the gel polymer and the lithium salt (115)," as used above, is defined as the total weight percentage of the second meta-solid-state electrolyte material (113) containing the combination of the gel polymer, the lithium salt (115), and the ionic ceramic particles (117). For example, in one or more embodiments, the total weight of the second meta-solid-state electrolyte material (113) material may contain approximately 90% to 94% of the ionic ceramic particles (117) and approximately 6% to 10% of the gel polymer and lithium salt (115) mixture, respectively. Depending on the specific battery model, the actual weight of the second meta-solid-state electrolyte material (113) may vary.

In one or more embodiments, in order to increase the ionic conductivity of the meta-solid-state battery (100), lithium salt (115) such as $LiPF_6$, $Li[N(SO_2F)_2]$ and $LiN(SO_2CF_3)_2$ and lithium garnet such as $Li_7La_3Zr_2O_{12}$, $Li_3OCl$ anti-perovskite, NASICON, LiAlTiSiPO (LATP), and $Li_{7-x}La_3Zr_{2-x}Ta_xO_{12}$ are added to the first and second meta-solid-state electrolyte materials. An advantage achieved by this combination is that the ionic conductivity of the ceramic-based conductor such as lithium garnet $Li_7La_3Zr_2O_{12}$ can be tuned by doping and manipulating the stoichiometry ratio of doping elements, for example, by doping and manipulating $Li_7La_3Zr_2O_{12}$ into $Li_{7-x}La_3Zr_{2-x}Ta_xO_{12}$ with a ratio between a range of approximately X=0.2 to 2.0.

Figure 2:
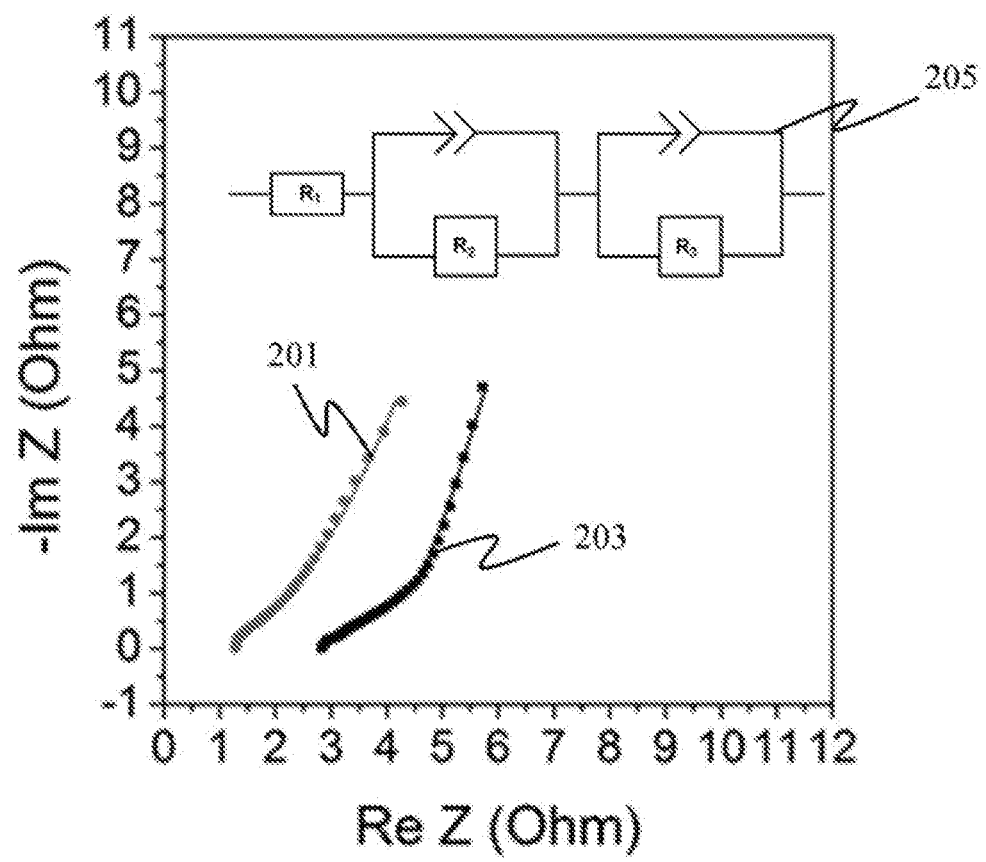
FIG. 2 shows a graph in accordance with one or more embodiments.

FIG. 2 is a graph of the electrochemical impedance spectroscopy (EIS) results for two different batteries. The first battery (201) is a lead-acid meta-solid-state battery of one or more embodiments with graphene modified electrodes. The second battery (203) is a lead-acid meta-solid-state battery of one or more embodiments without carbon modified electrodes. The data for both batteries will be taken and fitted with an equivalent circuit model (205). In one or more embodiments, the data for both batteries was fitted using Z-fit function of a data analysis software to fit the experimental results with the equivalent circuit model (205) using the following equation:

$$Z(f) = R_1 + \frac{R_2}{R_2 Q_2 (j2\pi f)^{a_2} + 1} + \frac{R_3}{R_3 Q_3 (j2\pi f)^{a_3+1}} \qquad \text{Equation 1}$$

Although graphene was the carbon additive used in this example, it may be apparent to one of ordinary skill in the art that the carbon additive is not limited to only graphene. Alternatively, as discussed above, the carbon additive may be any carbon allotropes such as, but is not limited to, carbon black, carbon fiber, carbon nanotubes, graphite, graphite oxide, graphene, and graphene oxide.

As seen in FIG. 2, the impedance result of the first battery (201) is comparable to the impedance result of the second battery (203). Therefore, the comparable results indicate that the lead-acid meta-solid-state battery of one or more embodiments with graphene modified electrodes is superior compared to the lead-acid meta-solid-state battery of one or more embodiments without carbon modified electrodes.

As further seen in FIG. 2, the ohmic resistance, which is the intercepting point of the curve with the x-axis, of the first battery (201) is much smaller compared to the second battery (203). The ohmic resistance of an electrolyte represents the electrolyte's electrolytic resistance.

In FIG. 2, the arc of the open loop in the circuit model (205) signifies the charge transfer resistance in the reaction layer where the electrochemical reaction processes occur at the interface of the active material. The value of the charge transfer resistance for one or more embodiments can be extracted using the circuit model (205).

Overall, FIG. 2 demonstrates that the addition of graphene to the electrode of a meta-solid-state battery is able to not only achieve comparable impedance results as that of the conventional battery, but also able to reduce the charge transfer resistance across the interface of the gel electrolyte and electrode surface.

Figure 3:
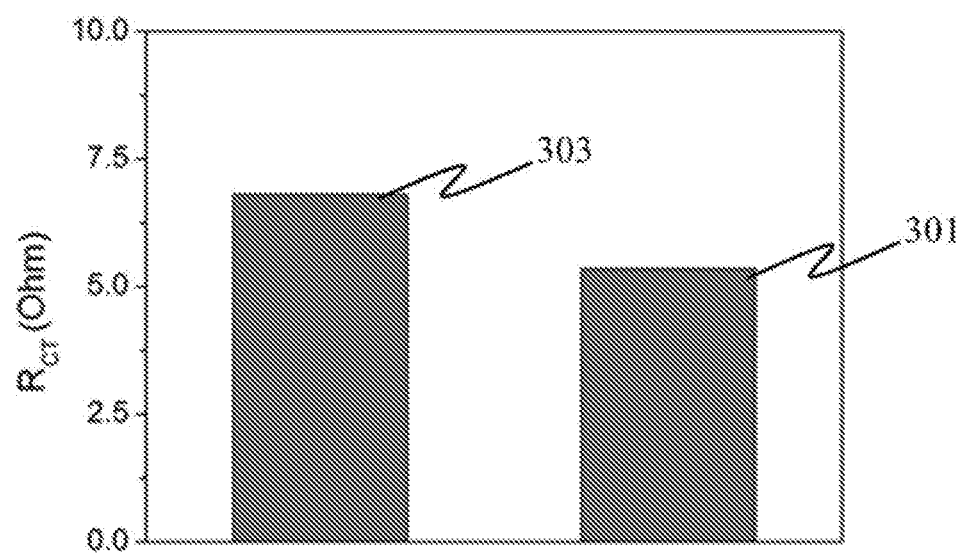
FIG. 3 shows a graph in accordance with one or more embodiments.

FIG. 3 is a graph showing the charge transfer resistance results obtained after fitting the results from FIG. 2 into the circuit model shown in FIG. 2. As demonstrated in FIG. 3, the charge transfer resistance of the first battery (301), a lead-acid meta-solid-state battery of one or more embodiments with graphene modified electrodes, is lower than the charge transfer resistance of the second battery (303), a lead-acid meta-solid-state battery of one or more embodiments without carbon modified electrodes. The lead-acid meta-solid-state battery of one or more embodiments with graphene modified electrodes and the lead-acid meta-solid-state battery of one or more embodiments without carbon modified electrodes have been described above in FIG. 2.

As demonstrated in FIG. 3, the charge transfer resistance of the first battery (301) is in a range of approximately $0.1\Omega$ to $5.31\Omega$ whereas the charge transfer resistance of the second battery (303) is in a range of approximately $0.1\Omega$ to $6.45\Omega$. The results demonstrate that the charge transfer resistance of the first battery (301) is approximately 21% lower than the charge transfer resistance of the second battery (303).

This indicates that the addition of graphene to the electrode of the first battery (301) reduces the charge transfer resistance within the reaction layer. As discussed above, the reaction layer is where the electrochemical reaction processes occur at the interface of the active material.

Figure 4:
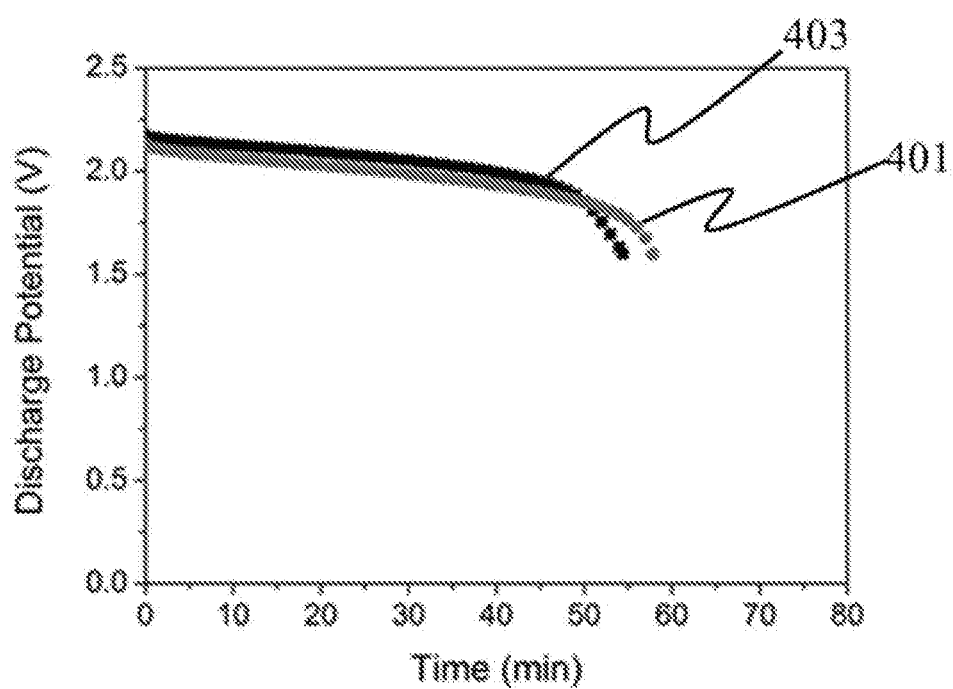
FIG. 4 shows a graph in accordance with one or more embodiments.

FIG. 4 is a graph showing discharge time results for the two batteries described in FIG. 2. In FIG. 4, a discharge time result for the first battery (401), the lead-acid meta-solid-state battery of one or more embodiments with graphene modified electrodes, is compared to a discharge time result for the second battery (403), a lead-acid meta-solid-state battery of one or more embodiments without carbon modified electrodes. The lead-acid meta-solid-state battery of one or more embodiments with graphene modified electrodes and the lead-acid meta-solid-state battery of one or more embodiments without carbon modified electrodes have been described above in FIG. 2.

As demonstrated in FIG. 4, the discharge time of the first battery (401) is approximately 6% longer than the discharge time of the second battery (403). The results demonstrate that the first battery (401) was not only able to deliver comparable performance to the second battery (403), but was also able to maintain a slightly longer overall discharge time.

The longer discharge time demonstrates that the capacity of the first battery (401) is larger than the capacity of the second battery (403). Furthermore, the longer discharge time also demonstrates that the addition of graphene increased the amount of energy that the first battery (401) can deliver compared to the amount of energy deliverable by the second battery (403).

Figure 5:
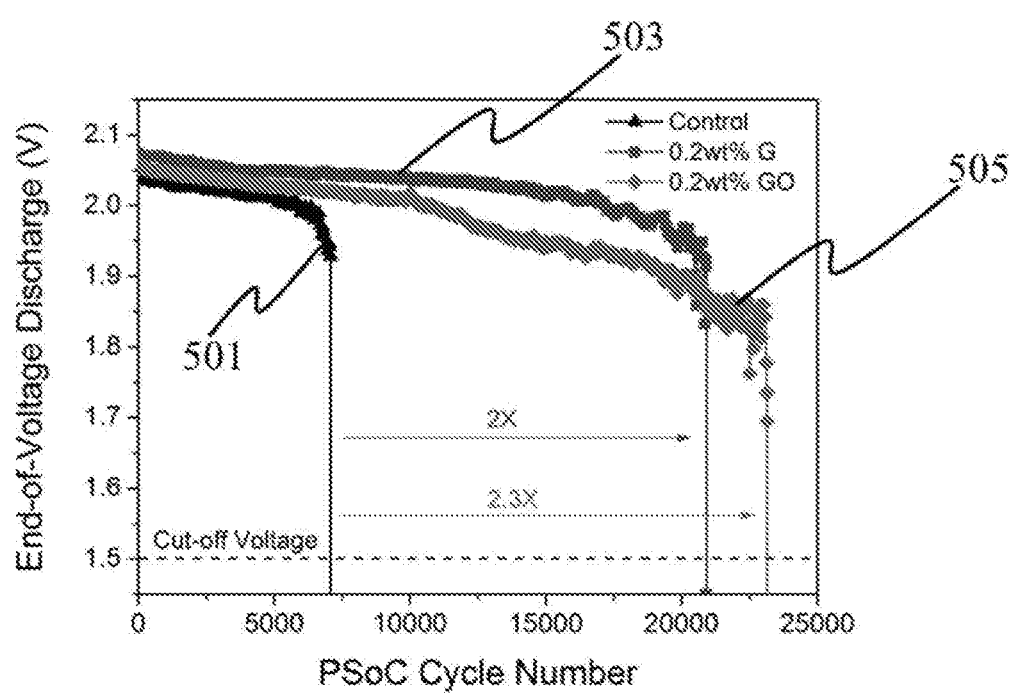
FIG. 5 shows a graph in accordance with one or more embodiments.

FIG. 5 is a graph showing the results of partial-state-of-charge (PSoC) tests conducted for three different batteries. The first battery is a control battery (501). The control battery (501) is a battery that is not modified with any carbon additives. The second battery (503) is a battery with the anode electrode modified with a carbon additive of graphene. The third battery (505) is a battery with the anode electrode modified with a carbon additive of graphene oxide. All three batteries are conventional lead-acid batteries with liquid electrolytes that do not contain meta-solid-state electrolytes.

In one or more embodiments, the anode electrode in the second battery (503) and the third battery (505) contain carbon additives of approximately 0.2% by weight (0.2 wt %) of each electrode.

In one or more embodiments, the phrase of "by weight of each electrode", as used above, is defined as the total weight percentage of a single electrode. For example, in one or more embodiments, the anode electrode has a total weight percentage of approximately 100%. The total amount of the carbon additive in the anode electrode is approximately 0.2% of the anode electrode's total weight percentage. Depending on the specific battery model, the actual weight of each electrode may vary.

Although graphene and graphene oxide were the carbon additives used in this example, it may be apparent to one of ordinary skill in the art that the carbon additive is not limited to only graphene and graphene oxide. Alternatively, as discussed above, the carbon additive may be any carbon allotropes such as, but is not limited to, carbon black, carbon fiber, carbon nanotubes, graphite, graphite oxide, graphene, and graphene oxide.

A partial-state-of-charge test is used to assess the cycle life of a battery. During a partial-state-of-charge test, the tested battery is partially charged and discharged repeatedly, each partial charge and discharge being one complete cycle, until a cut-off voltage is reached. The cut-off voltage is the cell or battery voltage at which the discharge is terminated and the battery is no longer able to supply power.

As demonstrated in FIG. 5, the second battery (503) and the third battery (505) both show PSoC results of over 20,000 cycles while the PSoC result of the control battery (501) is only 6,000 cycles. This result indicates that the cycle life of the second battery (503) and the third battery (505) are each 200% greater than the cycle life of the control battery (501.) The results also demonstrate that graphene and graphene oxide additives improve performance, likely due to their ability to effectively suppress sulfation, which is the accumulation of non-conductive lead sulfate ($PbSO_4$)

particles produced during the electrochemical reaction that occurs during the repeated partial charge and discharge of the batteries.

As further demonstrated in FIG. 5, compared to the graphene additive, it is believed that the graphene oxide additive was more effective in suppressing sulfation. In fact, as demonstrated in FIG. 5, the third battery (505) that was modified with graphene oxide has a larger partial-state-of-charge result with approximately 2,000 more cycles compared to the partial-state-of-charge result of the second battery (503) that was modified with graphene.

Figure 6:
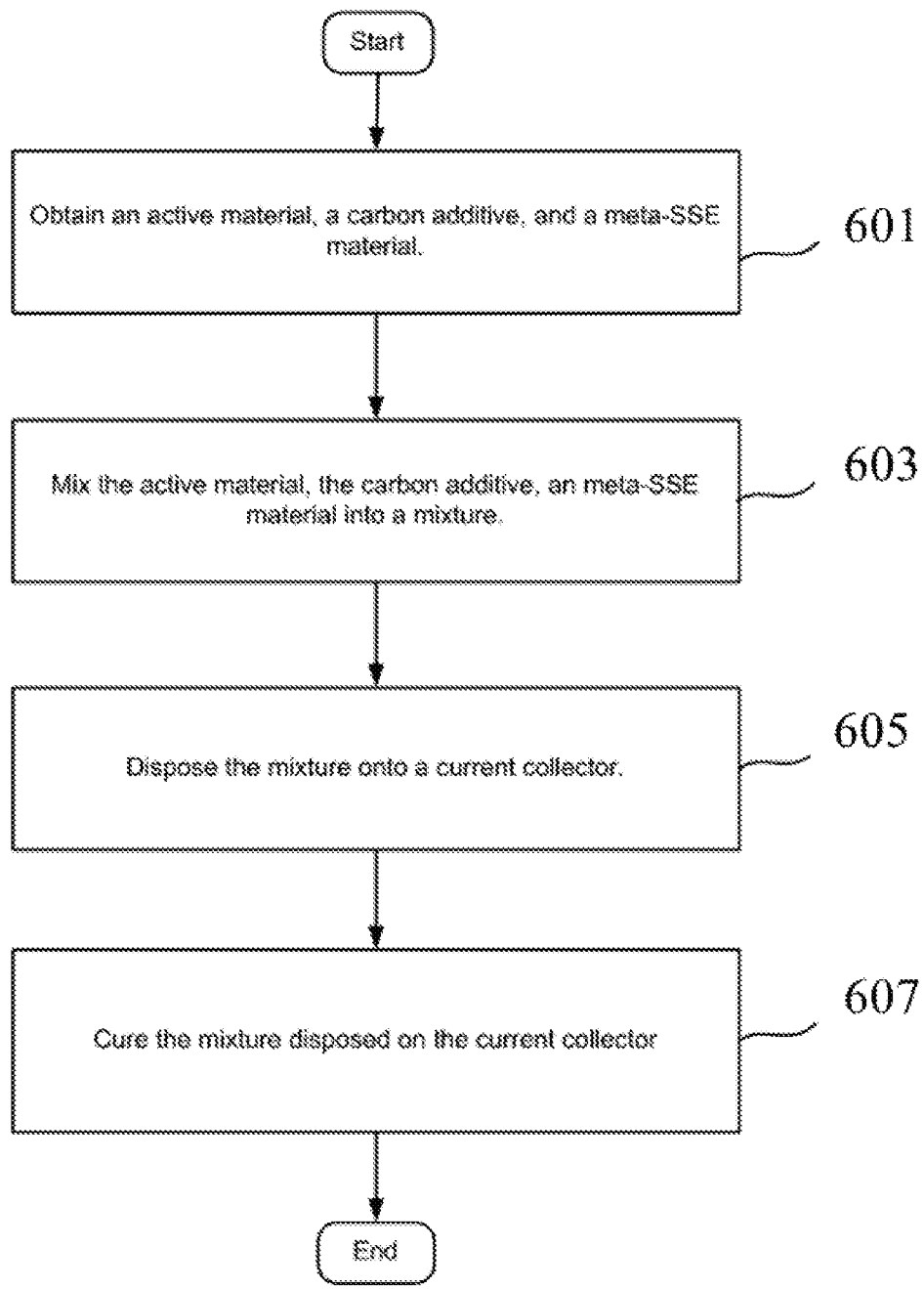
FIG. 6 shows a flow chart in accordance with one or more embodiments.

FIG. 6 shows a method for producing an electrode for a meta-solid-state battery in accordance with one or more embodiments. Specifically, FIG. 6 shows a method for producing an electrode for a meta-solid-state battery in accordance to one of the meta-solid-state batteries described in FIGS. 1A-D. It would be apparent to one of ordinary skill in the art that the method described below would be applicable to one or more embodiments of the meta-solid-state battery described in FIGS. 1A-D.

In Step 601, at least one of an active material, a carbon additive, and a meta-solid-state electrolyte material for producing the electrode for a meta-solid-state battery is obtained. In one or more embodiments, the composition of the meta-solid-state electrolyte may vary depending on the specific battery model.

In one or more embodiments, the carbon additives can be any carbon allotropes such as, but is not limited to, carbon black, carbon fiber, carbon nanotubes, graphite, graphite oxide, graphene, and graphene oxide. The carbon additives can be produced using chemical vapor deposition, liquid exfoliation, electrochemical exfoliation, microwave exfoliation, or chemical exfoliation. In one or more embodiments, the carbon additives can be functionalized with oxygen-containing groups and/or conducting polymers such as polyaniline, polyphenylene vinylene, or polyvinylpyrrolidone. In one or more embodiments, the carbon additives can be mixed into the electrode in the form of dried powder, liquid suspension, gel-like, or three-dimensional interconnected foam structures.

In one or more embodiments, the electrode for a meta-solid-state battery is made up of the active material in an amount of approximately 70% to 99.98% by weight of the electrode, the carbon additive in an amount of approximately 0.01% to 20% by weight of the electrode, and the meta-solid-state electrolyte material in an amount of approximately 0.01% to 10% by weight of the electrode.

In one or more embodiments, the phrase of "by weight of the electrode", as used above, is defined as the total weight percentage of the electrode. For example, in one or more embodiments, the electrode has a total weight percentage of approximately 100%. The total amount of the active material, the carbon additive, and the meta-solid-state material within the electrode should add up to the total weight percentage of approximately 100%. Depending on the specific battery model, the actual weight of the electrode may vary.

In one or more embodiments, in the example of a lead-acid battery, the active material is lead (Pb) or lead oxide ($PbO_2$). In one or more embodiments, the meta-solid-state electrolyte material is a gel polymer that is polyaniline (PANI), polyvinyl alcohol (PVA), silica gel or polydimethylsiloxane (PDMS). In one or more embodiments, the gel polymer of the meta-solid-state electrolyte is further mixed with sulfuric acid ($H_2SO_4$) in an amount of approximately 95% by weight of the meta-solid-state electrolyte material.

In one or more embodiments, the phrase of "by weight of the meta-solid-state electrolyte material", as used above, is defined as the total weight percentage the meta-solid-state electrolyte material. For example, in one or more embodiments, the meta-solid-state electrolyte material has a weight percentage of approximately 100%. The total weight of the gel polymer and the sulfuric acid ($H_2SO_4$) would add up to a total weight percentage of approximately 100%.

In one or more embodiments, the meta-solid-state electrolyte material containing gel polymer and sulfuric acid ($H_2SO_4$) is prepared using methods such as solution mixing, hydrothermal, or colloidal dispersion.

In one or more embodiments, in the example of a lithium-ion battery, the active material is lithium titanate oxide (LTO), lithium iron phosphate (LFP), lithium nickel manganese oxide (LNM), lithium ruthenium tin oxide (LRS) or lithium nickel cobalt manganese oxide (NMC). In one or more embodiments, the meta-solid-state electrolyte material is a gel polymer that is polyacrylonitrile (PAN) or polyacrylicacid (PAA). The meta-solid-state electrolyte material may further contain lithium salt in an amount of approximately 95% to 98% by weight of the meta-solid-state electrolyte material. In one or more embodiments, the meta-solid-state electrolyte material containing the combination of the mixture of the gel polymer and the lithium salt may further contain ionic ceramic particles in an amount of approximately 90% to 94% by weight of the meta-solid-state electrolyte material containing the combination of the mixture of the gel polymer and the lithium salt.

In one or more embodiments, the phrase of "by weight of the meta-solid-state electrolyte material," as used above, is defined as the total weight percentage the meta-solid-state electrolyte material containing only the gel polymer and the lithium salt. For example, in one or more embodiments, the total weight of the meta-solid-state electrolyte material may contain approximately 95% to 98% of the lithium salt and approximately 2% to 5% of the gel polymer, respectively. Depending on the specific battery model, the actual weight of the meta-solid-state electrolyte material may vary.

Similarly, in one or more embodiments, the phrase of "by weight of the meta-solid-state electrolyte material containing the combination of the mixture of the gel polymer and the lithium salt," as used above, is defined as the total weight percentage of the meta-solid-state electrolyte material containing the gel polymer, the lithium salt, and the ionic ceramic particles. For example, in one or more embodiments, the total weight of the meta-solid-state electrolyte material may contain approximately 90% to 94% of the ionic ceramic particles and approximately 6% to 10% of the gel polymer and lithium salt mixture, respectively. Depending on the specific battery model, the actual weight of the meta-solid-state electrolyte material may vary.

In one or more embodiments, the lithium garnet is fabricated through solid-state reaction or a sol-gel method. In one or more embodiments, the meta-solid-state electrolyte material containing the gel polymer, the lithium salt, and the ionic ceramic particles is prepared using methods such as solution mixing, hydrothermal, colloidal dispersion, or a sol-gel method.

In one or more embodiments, the lithium salt is first dissolved in a mixture of propylene carbonate (PC) and dimethyl carbonate (DEC) to form a first mixture. The first mixture is then added to the gel polymer to form a lithium conductive polymer. The lithium conductive polymer is then mixed with the prepared lithium garnet to form the meta-solid-state electrolyte material.

In Step 603, the active material, the carbon additive, and the meta-solid-state electrolyte material obtained in Step 601 are mixed together to form an electrode mixture. In one or more embodiments, the method of mixing the active material, the carbon additive, and the meta-solid-state electrolyte material may vary depending on the type of battery being produced.

In one or more embodiments, in the example of the lead-acid battery, the active material, the carbon additive, and the meta-solid-state electrolyte material is mixed together using a planetary mixer.

In one or more embodiments, in the example of the lithium-ion battery, the active material, the carbon additive, and the meta-solid-state electrolyte material are mixed together using a motorized dissolver stirrer at 1000 rpm for 1 hour.

In Step 605, the electrode mixture from Step 603 is disposed on the surface of a current collector. In one or more embodiments, the method of disposing the electrode mixture onto the surface of the current collector may vary depending on the type of battery being produced.

In one or more embodiments, the term "disposed" is defined as a surface of a first component is "in physical contact with" a surface of a second component. For example, in terms of the electrode mixture and the current collector, a surface of the current collector is in physical contact with a surface of the electrode mixture. In one or more embodiments, the term "disposed" is alternatively or further defined as "in electrical contact with". For example, it is possible to transport electrical charges between the surfaces of the two components that are disposed on each other.

In one or more embodiments, in the example of the lead-acid battery, the electrode mixture is printed onto the surface of the current collector. In one or more embodiments, the electrode mixture is mechanically pressed or spread onto the surface of a current collector. The current collector with the electrode mixture is then pressed to form an electrode.

In one or more embodiments, in the example of the lithium-ion battery, the electrode mixture is printed or sprayed onto the surface of the current collector. In one or more embodiments, a screen mesh was pressurized by a rubber squeegee to coat the electrode mixture onto the current collector. The distance between the screen mesh and the current collector is approximately 50 μm.

In Step 607, the current collector with the electrode mixture from Step 605 is cured. In one or more embodiments, the method of curing the current collector with the electrode mixture may vary depending on the type of battery being produced. After the current collector with the electrode mixture is cured, the carbon additive and the meta-solid-state material in the resulting electrode are uniformly distributed within the electrode.

In one or more embodiments, in the example of the lead-acid battery, the current collector with the electrode mixture is cured in a humidity chamber. In one or more embodiments, the current collector with the electrode mixture is cured in a humidity chamber at approximately 40° C. to 80° C. with a relative humidity (RH) of approximately 65% RH to 95% RH for approximately 10-40 hours and then at approximately 40° C. to 80° C. only for approximately 10-40 hours.

In one or more embodiments, in the example of the lithium-ion battery, the current collector with the electrode mixture is cured in an oven. In one or more embodiments, the current collector with the electrode mixture is cured in an oven at a temperature of 40° C. to 80° C. only for approximately 10-40 hours.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A meta-solid-state battery comprising:
a first layer that is a cathode electrode;
a second layer that is an anode electrode;
a third layer comprising a first meta-solid-state electrolyte material disposed between the first layer and the second layer;
a first current collector and a second current collector,
wherein the first layer is disposed on the first current collector and the second layer is disposed on the second current collector,
wherein each of the cathode electrode and the anode electrode comprises:
an active material in an amount ranging from approximately 70% to 99.98% by weight;
a carbon additive in an amount ranging from approximately 0.01% to 20% by weight; and
a second meta-solid-state electrolyte material in an amount ranging from approximately 0.01% to 10% by weight, and
wherein the first and second meta-solid-state electrolyte material comprise a gel polymer,
wherein the first and second meta-solid-state electrolyte material further comprise lithium salt and ionic conducting ceramic particles,
wherein the lithium salt is one selected from a group consisting of $LiPF_6$, $Li[N(SO_2F)_2]$ and $LiN(SO_2CF_3)_2$ in an amount ranging from approximately 95% to 98% by weight of the gel polymer.

2. The meta-solid-state battery of claim 1, wherein each of the cathode electrode and the anode electrode comprises:
an active material in an amount ranging from 90% to 98.9% by weight;
a carbon additive in an amount ranging from 0.1% to 5% by weight; and
a second meta-solid-state electrolyte material in an amount ranging from 1% to 5% by weight.

3. The meta-solid-state battery of claim 1, wherein the meta-solid-state battery is a rechargeable battery.

4. The meta-solid-state battery of claim 1, wherein the carbon additive is one selected from a group consisting of carbon black, carbon fiber, carbon nanotubes, graphite, graphite oxide, graphene, and graphene oxide with a range of 0.1 nm to 500 μm in size.

5. The meta-solid-state battery of claim 1, the amount of the carbon additive is approximately 0.2% by weight.

6. The meta-solid-state battery of claim 1, wherein the carbon additive is produced using chemical vapor deposition, liquid exfoliation, electrochemical exfoliation, microwave exfoliation, or chemical carbon additives, and are functionalized with oxygen-containing groups or conducting polymers.

7. The meta-solid-state battery of claim 1, wherein the first and second meta-solid-state electrolyte materials have a charge transfer resistance in a range of approximately 0.1Ω to 5.31Ω.

8. The meta-solid-state battery of claim 1, wherein the meta-solid-state electrolyte material is prepared using solution mixing, hydrothermal colloidal dispersion, or sol-gel and is mixed with the active material through solution mixing, centrifugation, pressure infiltration, or vacuum infiltration.

9. The meta-solid-state battery of claim 1, wherein the cathode and anode electrodes are lead acid battery electrodes.

10. The meta-solid-state battery of claim 9, wherein the active material is one selected from a group consisting of Pb and $PbO_2$, and the gel polymer is one selected from a group consisting of polyaniline (PANI), Polyvinyl alcohol (PVA), and polydimethylsiloxane (PDMS).

11. The meta-solid-state battery of claim 10, wherein the first and second meta-solid-state electrolyte material contains sulfuric acid ($H_2SO_4$) in an amount of approximately 20% to 95% by weight.

12. The meta-solid-state battery of claim 1, wherein the cathode and anode electrodes are lithium-ion battery electrodes.

13. The meta-solid-state battery of claim 12, wherein the active material is one selected from a group consisting of lithium iron phosphate (LFP), lithium titanate oxide (LTO), lithium ruthenium tin oxide (LRS), lithium nickel cobalt manganese oxide (NMC), and Lithium nickel manganese oxide (LNM), and the gel polymer is one selected from a group consisting of polyacrylonitrile (PAN) and polyacrylicacid (PAA).

* * * * *